3,354,210
CYCLOHEXANE, -ENE, -DIENE-NF₂ REACTION PRODUCTS

Leland K. Beach, Westfield, Henry R. Ertelt, Fanwood, Donald A. Guthrie, Cranford, and Richard P. Rhodes, Newark, N.J., assignors to Esso Research and Engineering Company, a corporation of Delaware
No Drawing. Filed Aug. 14, 1961, Ser. No. 131,421
13 Claims. (Cl. 260—563)

This invention relates to difluoramino derivatives of cyclohexane (cyclohexene, cyclohexadiene) and methods for the preparation of these derivatives that are useful as oxidizer ingredients in high energy rocket propellant composites.

Now in accordance with the present invention the cyclohexadiene isomers (1,4 and 1,3) have been found to react with $N_2F_4$ in an unusual manner to yield cyclic compounds having carbon in the cyclic nuclei bonded to $NF_2$ groups in distinctive configurations. Some of the resulting products have been isolated and determined to have especially good compositions and properties for use as high-energy oxidizers. Some of the products have been isolated and determined to be useful as intermediates for further reaction under suitable conditions to obtain higher energy products that are useful propellant ingredients.

In the past it has been known that $N_2F_4$ adds to olefinic double bonds, either isolated or conjugated. It has now been found that $N_2F_4$ reacts with 1,4-cyclohexadiene in a surprising manner, yielding as major initials products $HNF_2$ and the two isomers of difluoramino-cyclohexadiene arising by substitution, not addition. For an exact determination of reaction steps, reaction controls and isolation of the cyclohexadiene-$N_2F_4$ reaction products, it is important to consider the reactions of each of the cyclohexadiene isomers. These isomers are represented by the following structural formulae:

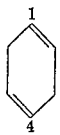   

1,4-cyclohexadiene     1,3-cyclohexadiene
(CHD)              (CHD)

Some of the minor products of the reaction of $N_2F_4$ with 1,3-cyclohexadiene are the same as those obtained from the $N_2F_4$ reaction with 1,4-cyclohexadiene. This is undoubtedly due to the mechanism of the reactions. Both radical attack of cyclohexadienes and radical elimination yield a variety of possible products. An examination of possible rearrangements of the different radical species shows that some of the products of the reaction of $N_2F_4$ with both isomers of cyclohexadiene must be the same.

Foremost among the useful products isolated from reaction of $N_2F_4$ with 1,4-cyclohexadiene or its partial reaction derivatives are 1,2,3,4,5-pentakis (difluoramino) cyclohexane, 1,2,4,5-tetrakis (difluoramino) cyclohexane, tris (difluoramino) cyclohexenes, and 3-difluoramino-1,4-cyclohexadiene. A most unusual and distinctly unexpected reaction of 1,4-cyclohexadiene with $N_2F_4$ is the abstraction of hydrogen in high yield. This rather than simple addition to the double bonds is the initial step and accounts for 90% more or less of the overall initial reactions: i.e., 1,4 $CHD + N_2F_4 \rightarrow$ difluoramino cyclohexadienes $+ HNF_2$.

Foremost useful isolated products from reaction of $N_2F_4$ with 1,3-cyclohexadiene or its partial reaction derivatives are 1,2,3,4-tetrakis (difluoramino) cyclohexane isomers and bis (difluoramino) cyclohexenes.

The foremost useful products are those that can be recovered in satisfactory yields, that have certain properties that make them suitable for use in propellants and those intermediates formed by partial reaction that can be further reacted to convert them into higher-energy oxidizers.

A general procedure used for the batch reaction of 1,3 and 1,4 cyclohexadienes with $N_2F_4$ comprises the following steps:

(a) Freezing the measured charge of dry cyclohexadiene placed in a reactor (Pyrex bulb or stainless steel bomb) and evacuating inert gases and air from the reactor.

(b) Introducing a measured amount of $N_2F_4$ gas into the reactor containing the cyclohexadiene (CHD) charge (1 to 12 moles $N_2F_4$/1 mole CHD).

(c) Chilling to solidification of the $N_2F_4$ and CHD charge, and evacuating residual gas at $-196°$ C.

(d) Warming up the charge of reactants to the reaction temperature, e.g., in the range of about 0° C. to 250° C.

(e) After reaction is finished, cooling the reaction mixture, withdrawing unreacted gas, then removing the product.

(f) Fractionating and purifying the product to recover desired fractions.

The procedure for the reaction of cyclohexadienes with $N_2F_4$ in a continuous manner is carried out by passing the reactants (diluted with 2–20 volumes of an inert gas such as nitrogen) through a heated Pyrex or stainless steel reaction zone comprising a length of 1/4" diameter tubing. The products are collected in a cold trap and unreacted gases are vented.

Example I.—Reaction of 1,4-cyclohexadiene with $N_2F_4$

The reaction of $N_2F_4$ with 1,4-cyclohexadiene at pressures less than one atmosphere gave a similar variety of products in a number of runs of widely varying conditions. The pressure ranged from 200–600 mm. Hg absolute, the temperature from 20° C. to 250° C., the mole ratio of $N_2F_4$/1,4-CHD from 1.6/1 to 8/1 and reaction periods from 0.07 to 113 hours. One run, also tabulated in the following Table 1 was carried out in a flow reactor. The products, after removal of $HNF_2$ and unreacted $N_2F_4$, were pipetted from the reaction vessel and analyzed by gas chromatography (GC) at 75° C. on a 2 meter, 1/4" column of silicone oil on a firebrick support. The products are discussed according to their retention time on this column relative to benzene (the RRT value). Trials with known $NF_2$ compounds in this series have shown that area percent very nearly approximates the weight percent of these compounds in a mixture.

The foregoing procedures are typical but modifications may be made in the conditions, e.g., temperatures, pressures, proportions, time, and dimensions, also, in the manner of admixing the reactants, as will be apparent to one skilled in the art.

TABLE 1.—1,4 CYCLOHEXADIENE-N₂F₄ REACTION PRODUCTS AND CONDITIONS

[Reactions in glass, pressure 400-476 mm. Hg]

| Temperature, °C | 20 | 40 | 125 | 200 | 200 | 250 | 250 [1] |
|---|---|---|---|---|---|---|---|
| Time at Temperature, Hrs | 113 | 88 | 0.1 | 2-6 | 1 | 1.75 | 0.07 |
| Mole Ratio: N₂F₄/C₆H₈ | 2.5/1 | 1.6/1 | 3.8/1 | 2/1-4/1 | 4/1 | 8/1 | 2/1 |

G.C. Area Percent of Volatile Liquid Products [2]

| RRT: | | | | | | | |
|---|---|---|---|---|---|---|---|
| 1.0 Benzene | 9 | 17 | 10 | 8-20 | 1-11 | 3 | 7 |
| 1.4 (1,4-CHD) | 37 | 14 | 0 | | | | 2 |
| 4.5 | 34 | 33 | 32 | 4 | 1 | 1 | 3 |
| 7.2 | 1 | 1 | 6 | 1 | 1-2 | | 3 |
| 8.9 | | | | 1-4 | | | 7-8 |
| 11 | 14 | 23 | 36 | 40-50 | 46-55 | 55 | 51-55 |
| 15.5 | 2 | 4 | 7 | 10-14 | 14-17 | 18 | 18-19 |
| 18.0 | 3 | 4 | 8 | 10-14 | 13-15 | 16 | 7 |
| 23.0 | | 1 | 1 | 0-2 | 3 | | 1 |
| 28.0 | | | | | | | 1 |
| 32.0 | | | | | 1-2 | 2 | |
| 38.0 | | | | | 5-7 | 3 | |

[1] In Stainless Steel Flow Reactor.
[2] Minor Peaks, below 1% and those with RRT below 1.0 are omitted.

NOTE.—The products having a major amount of materials with RRT above about 10 have elemental analyses corresponding to about 2.5 NF₂/6C to about 4 NF₂/6C.

In the reactions carried out at lower temperatures and/or short reaction times, conversion was not complete (1,4 CHD was recovered); about ⅓ of the product comprised the 4.5 RRT peak identified as 3-difluoramino-cyclohexadiene-1,4; and about ⅓ of the product comprised the various "tris" isomers of 11, 15.5 and 18 RRT. At higher temperatures and longer reaction times most of the volatile liquid product comprised these "tris isomers."

The 4.5 RRT product was separated on preparative G.C. to 97.6% purity. Analyses follow:

TABLE 2.—IDENTIFICATION OF 3-DIFLUORAMINO-CYCLOHEXADIENE-1,4

| | Found | Cacl. for C₆H₇NF₂ |
|---|---|---|
| A. Analysis: | | |
| Percent C | 55.0 | 55.0 |
| Percent H | 5.60 | 5.35 |
| Percent N | [1] 9.45 | 10.7 |
| Percent F | 30.0 | 29.0 |
| Mol. Wt. (Vap. Density) | 124 | 131 |
| Vapor Pressure, mm. (23° C.) | 15.0 | |

[1] Loss of sample by evaporation during purge cycle of nitrogen analyzer.

B. The I.R. shows strong NF₂ bands at 11.7 and 12.3 microns, and a pattern similar to unsubstituted 1,4-cyclohexadiene.
C. The U.V. shows no conjugated diene at 2550 to 2600 Å.

This compound in the gas phase at temperatures above 80° C. decomposes rapidly in a completely unexpected manner to give benzene and difluoramine. No other C—NF₂ compound is known to do this. The H analysis and very high yield of benzene and HNF₂ by decomposition make it quite clear the compound is a diene. The choice of a non-conjugated structure was dictated by absence of U.V. absorption and its very low reactivity with N₂F₄ (a conjugated diene adds N₂F₄ very rapidly). Thus the compound is 3-difluoramino-cyclohexadiene-1,4.

The 11 RRT product was separated by high vacuum distillation to give a fraction comprising 95% of this component (B.P. 97° C. at 75 mm. Hg). Reaction with ozone proceeded rapidly at −20° C. in CCl₄ solution, and at 20° C. it reacted slowly with bromine and was moderately soluble in concentrated H₂SO₄. These reactions demonstrate the presence of an olefinic bond. The following average analyses were obtained:

TABLE 3.—IDENTIFICATION OF TRIS (DIFLUORAMINO) CYCLOHEXENE

| | Found | Theory for C₆H₇(NF₂)₃ |
|---|---|---|
| A. Analysis: | | |
| Percent C | 30.3 | 30.6 |
| Percent H | 3.3 | 3.0 |
| Percent F (Hydrolysis) | 49.0 | 48.5 |
| Percent F (by NMR) | 50.8 | 48.5 |
| Percent N | 18.8 | 17.9 |
| F/N | 1.99 | 2.00 |
| B. Molecular Weight: By Victor Meyer Method | 235, 240 | 239 |
| C. High Resolution NMR: | | |
| Olefinic proton | 0.306 | 0.286 |
| Proton α to NF₂ | 0.426 | 0.428 |
| Proton α to olefin (or β to NF₂) | 0.268 | 0.286 |

A major peak at mass 79, corresponding to the fragment C₆H₇ arising by removal of three NR₂ groups.

The 15.5 and 18.0 RRT products are stereoisomers of the 11.0 RRT product, tris (difluoramino) cyclohexene. Data illustrating this point are presented in the following Table 4 where the same analyses are obtained regardless of the ratio of 11 RRT to 15.5+18 RRT in the sample analyzed.

TABLE 4.—TWO OTHER TRIS NF₂ CYCLOHEXENE ISOMERS

| | Sample A— 95% 11 RRT, 5% 15.5+18 RRT | Sample B— 68% 11 RRT, 16% 15.5 RRT, 16% 18.0 RRT |
|---|---|---|
| Analysis: | | |
| Percent C | 30.3 | 32.0 |
| Percent H | 3.3 | 4.5 |
| Percent F | 49.0 | 48.6 |
| Percent N | 18.8 | 18.5 |
| Proton NMR: | | |
| Olefinic | 0.306 | 0.270 |
| α to NF₂ | 0.426 | 0.438 |
| α to olefin (or β to NF₂) | 0.268 | 0.292 |

*Example II.*—*Preparation of pentakis (difluoramino) cyclohexane*

The intermediate products (identified above as tris NF₂ cyclohexenes) having RRT values of 11, 15.5, and 18 were subjected to further reaction with N₂F₄ in stainless steel bombs under superatmospheric pressure, e.g. 400–460 p.s.i. at temperatures of 80° C. to 200° C. with and without inert diluents, such as n-pentane and preferably CCl₄. The products formed had RRT values of in the range 19–28 on G.C. analysis. The better results were obtained using the solvents, temperatures of about 175° C. and reaction times of about 3–4 hours. Results of these experiments are listed in the following Table 5.

TABLE 5.—PREPARATION OF PENTAKIS (DIFLUORAMINO) CYCLOHEXANE [1]

| Run No | I | II | III | IV | V | VI | VII | VIII | B. Feed Area, percent |
|---|---|---|---|---|---|---|---|---|---|
| Temperature (° C.) | 125 | 125 | 155 | 175 | 175 | 175 | 200 | 175 | |
| Time (Hours) | 16 | 24 | 2.0 | 1.6 | 2.5 | 3.5 | 0.43 | 2.0 | |
| Conc. in CCl$_4$ (Wt. percent) | 16 | 15 | 17 | 19 | 19 | 16 | 30 | 17 | |

| RRT | A. Feed Area, percent [2] | Product Area, percent [2] | | | | | | | Product Area, percent |
|---|---|---|---|---|---|---|---|---|---|
| 11 | 68.3 | 37.5 | 28.5 | 40.8 | 10.0 | 6.6 | 6.2 | 9.9 | 5.4 | 86.7 |
| 15.5 | 23.1 | 17.0 | 12.3 | 18.0 | 8.3 | 6.4 | 5.0 | 13.2 | | |
| 18 | 4.4 | | | | | | | | | 7.7 |
| 19 | 0 | 12.0 | 20.0 | 13.0 | 26.4 | 27.4 | 29.6 | 24.3 | 32.0 | |
| 23 | 0 | 27.6 | 32.9 | 22.0 | 45.6 | 48.3 | 53.4 | 40.0 | 47.9 | |
| 28 | 0 | 2.0 | 3.8 | 2.3 | 4.8 | 7.3 | 2.3 | ca 2 | 4.3 | |

[1] Reactions carried out in agitated, stainless steel bombs of about 7 cc. capacity, using an acid washed feed which was distilled to concentrate the 11.0, 15.5 and 19.0 RRT intermediates prepared as described in Example I. N$_2$F$_4$ pressure ranged from 410 to 490 p.s.i.a.

[2] Determined on 2 Meter G.C. silicone oil on firebrick column at 75° C. Minor peaks below 11 RRT are not included.

NOTE.—The products have elemental analyses corresponding to about 4 NF$_2$/6 C to about 6 NF$_2$/6 C.

Principal products had RRT values of 19 and 23. Conversions ranged from about 40% (RUN III) to over 90% (RUN VI). The pentakis (NF$_2$) cyclohexane is a water-white oil mixture of stereoisomers. It has a specific gravity of about 1.76 g./ml. and a vapor pressure of about 10$^{-2}$ mm. Hg at 20° C. This density falls in line with those of other members of the 1,4-cyclohexadiene-N$_2$F$_4$ reaction products made and isolated. Thus pentakis (NF$_2$) cyclohexanes are of interest as a high density, low-volatility liquid components in rocket propellants. They can be used as a plasticizer in a 290 ISP propellant composite, e.g., with powdered boron, hexanitroethane, and 20% binder such as polybutadiene-NF$_2$ adduct having the recurring unit [C$_4$H$_6$(NF$_2$)$_{1.7}$].

Repeated capillary distillation of these products (ca. 100° C., 0.001 mm.) gave a fraction analyzing by GC as follows:

TABLE 6

| Rel. Ret. Time | Area, Percent | Designation |
|---|---|---|
| <19 | 2.4 | Unidentified NF$_2$ cyclohexanes. |
| 19+23 | 93.5 | Pentakis NF$_2$ cyclohexane isomers. |
| >23 | 4.1 | Unidentified NF$_2$ cyclohexanes. |

TABLE 7.—IDENTIFICATION OF PENTAKIS (DIFLUOR AMINO)-CYCLOHEXANE

| | Found | Theory for C$_6$H$_7$(NF$_2$)$_5$ |
|---|---|---|
| A. Analysis: | | |
| Percent H, by NMR | 2.42 | 2.1 |
| Percent F, by NMR | 57.35 } 56.0 | 56.1 |
| Percent N: | 54.7 | |
| Hydrolysis and distillation | | |
| By Coleman Dumas | 20.36 } 20.31 | 20.6 |
| By Combustion—GC | 20.26 | |
| Percent C, By Combustion—GC | 21.86 | 21.2 |
| Total | 100.59 | 100.0 |
| Ratio: | | |
| C/N | 1.25 | 1.20 |
| F/N | 2.03 | 2.00 |
| B. Mol. Wt.: | | |
| Victor Meyer | 334 } 339 | |
| Osmometer vs. NF$_2$ Standard | 323 | |
| C. High Resolution NMR | No C-F bonds, No olefinic H | |
| Ratio: $\dfrac{H\alpha \text{ to NF}_2}{H\beta + \text{ to NF}_2}$ [1] | 2.82±0.4 | 2.50 |
| D. Density: (Avg. of 2 samples) (24° C.) | 1.746±0.005 | |

[1] Only two proton peaks were observed: (1) 25.2 parts/10$^7$ re benzene (proton α to NF$_2$) and (2) 46.2 parts/10$^7$ re benzene (proton β + to NF$_2$).

*Example III.—Preparation of 1,2,4,5-tetrakis (difluoramino) cyclohexane*

The tetrakis (NF$_2$) cyclohexane product from the reaction of N$_2$F$_4$ with 1,4-cyclohexadiene is another interesting product. It is a white, crystalline, high melting point solid with an RRT value of 38 by GC analysis. Formation of this material is favored by distilling and recycling low boiling adducts. It was sublimed from residue after stripping the crude product under 10$^{-3}$ mm. Hg abs. at 50 to 100° C.

TABLE 8.—ANALYSIS OF 1,2,4,5-TETRAKIS (DIFLUORAMINO) CYCLOHEXANE

| Element | Percent Found | Percent Theory (C$_4$H$_2$(NF$_2$)$_6$) |
|---|---|---|
| F | 51.0 | 52.8 |
| C | 25.3 | 25.0 |
| H | 2.8 | 2.8 |
| N | 20.0 | 19.4 |
| Molecular Weight | 280±10 | 288 |

IR (Consistent with Structure).
Solubility: Ethanol, Very Soluble; Ketone, Soluble (acetone); Benzene, Insoluble.
Density, 1.85±.1 gm./cc.
M.P., 157° C.

It thus has a 2/3, NF$_2$/C. Its high density and the fact that it is a solid is advantageous for relative boost velocity in a propellant.

*Example IV.—Reaction of 1,3-cyclohexadiene with N$_2$F$_4$*

The reaction of 1,3-cyclohexadiene with N$_2$F$_4$ differs unexpectedly from the reaction of 1,4CHD in being completely and unpredictably an addition and not a substitution reaction. This reaction gives 100% conversion in about 2.5 hours at 20° C., 300 mm. Hg abs. The rate is thus 1000 times the rate of addition to cyclohexene. One mole of N$_2$F$_4$ reacts with one mole 1,3CHD to yield isomeric bis(NF$_2$) cyclohexenes, and no HNF$_2$ is formed. The four bis isomers are formed by cis and trans addition either 1,2 or 1,4 to the double bond system. Analyses agree well with a bis olefin structure. (Percent NF$_2$ (by N+F)=56.7; theory=56.5.)

The bis (NF$_2$) cyclohexenes formed from 1,3CHD can be reacted readily with N$_2$F$_4$ in a second stage, preferably under high N$_2$F$_4$ pressure to form tetrakis (NF$_2$) cyclohexane isomers. This can be concentrated in high purity and yield. The 3,4-bis (difluoroamino) cyclohexene-1, both cis and trans react well in this manner (e.g., 15% in CCl$_4$, 100° C., 410 p.s.i., N$_2$F$_4$, 3 hours). Under more severe conditions as above, except 125° C., 16 hours, all four of the bis isomers react to form tetrakis. GC data show that the tetrakis NF$_2$ products obtained are mixtures of the various possible isomers. Fractionation of the products and further analysis showed that the main products were, in fact, the isomeric 1,2,3,4-tetrakis cyclohexane. These analyses are listed below:

TABLE 6

| Analysis | Found | Theory for $C_6H_8(NF_2)_4$ |
|---|---|---|
| Percent N | 19.3 | 19.4 |
| Percent F | 51.5 | 52.7 |
| Percent C | 26.4 | 25.0 |
| Mol. Wt | 276 | 288 |

This tetrakis product mixture has a density of 1.57 g./cc. and is obtained in high yields from 1,3CHD. It is a useful propellant oxidizer ingredient in having high density, low volatility and fairly high energy value ($4NF_2/6C$).

As the procedures for reacting the cyclohexadiene isomers are similar, mixtures of the 1,3 and 1,4 isomers may be reacted with $N_2F_4$. However, for preparing a particular product it is preferred to react each separately under most suitable conditions.

The series of compounds thus prepared by the reactions of 1,4 and 1,3-cyclohexadiene with $N_2F_4$ have the following densities (compared with that of cyclohexane).

TABLE 10.—RELATION OF COMPOSITION AND DENSITIES OF CYCLOHEXADIENE AND ITS LIQUID $N_2F_4$ REACTION PRODUCTS

| Compound | $NF_2/6C$ | Density (g./ml.) |
|---|---|---|
| $C_6H_{12}$ | 0 | 0.78 |
| $C_6H_8(NF_2)_2$ | 2 | 1.30 |
| $C_6H_7(NF_2)_3$ | 3 | 1.50 |
| $C_6H_8(NF_2)_4$ | 4 | 1.57 |
| $C_6H_7(NF_2)_5$ | 5 | 1.76 |

Variations may be made in the procedures and conditions in accordance with the disclosed principles set forth.

The initial substitution reaction of 1,4CHD occurs over a wide range of conditions, from subatmospheric pressure, e.g., 200 mm. Hg absolute to superatmospheric pressure, e.g., 450 p.s.i., at temperatures from about 0° C. to about 250° C., in the presence or absence of inert diluents, liquid or gas. Since under severe conditions, particularly high pressure, the 1,4CHD can polymerize and thus reduce the yield of useful monomeric-$NF_2$ compounds, in general, the initial reaction of the 1,4CHD will be carried out under relatively low pressure, in the range of 100 to 900 mm. Hg absolute, e.g., 200 to 760 mm. It will be apparent to those skilled in the art that the reaction variables, time, temperature, pressure, and dilution may be adjusted so that the substitution reaction may be carried out at higher pressures with a minimum of polymerization. Conversion of these initial products, in particular mixtures rich in the tris ($NF_2$) cyclohexenes, to more highly difluoraminated compounds, is favored by higher pressure in the range of 200 to 600 p.s.i.

In all products resulting from the reactons of CHD with $N_2F_4$ there are significant amounts of compounds not yet fully identified. These unidentified compounds appear to be the difluoraminated cyclohexanes and difluoraminated cyclohexenes. The extent of substitution and the degree of unsaturation remaining has not yet been determined. While identification of individual products as discussed has required different separation techniques, it is apparent that the crude reaction product and particularly the crude reaction product stripped of more volatile materials (i.e., those products having an RRT of below about 7) is a useful oxidizer for propellants and a valuable intermediate for conversion to more highly difluoraminated compounds.

The invention described is claimed as follows:

1. Cyclohexadiene-$N_2F_4$ reaction products having 1 to 5 $NF_2$ groups attached to ring nuclei carbon atoms in compounds selected from the group consisting of mono (difluoramino) cyclohexadiene, bis (difluoramino) cyclohexene, tris (difluoramino) cyclohexene, tetrakis (difluoramino) cyclohexene, tetrakis (difluoramino) cyclohexane and pentakis (difluoramino) cyclohexane.

2. Mono (difluoramino) cyclohexadiene.

3. Tris (difluoramino) cyclohexene.

4. Pentakis (difluoramino) cyclohexane.

5. Tetrakis (difluoramino) cyclohexane.

6. Bis (difluoramino) cyclohexene.

7. Process for preparing tris ($NF_2$) cyclohexene, which comprises reacting 1,4-cyclohexadiene with $N_2F_4$ under a pressure of about 100 to 900 mm. Hg absolute at 0° to 250° C.

8. Process for preparing pentakis ($NF_2$) cyclohexane which comprises reacting tris ($NF_2$) cyclohexene with $N_2F_4$ under a pressure of about 200 to 600 p.s.i. absolute at 125° C. to 250° C.

9. Process for preparing bis ($NF_2$) cyclohexene which comprises reacting 1,3-cyclohexadiene with $N_2F_4$ under a pressure of about 200 to 700 mm. Hg about −20° C. to 200° C.

10. Process for preparing tetrakis ($NF_2$) cyclohexane which comprises reacting bis ($NF_2$) cyclohexene with $N_2F_4$ under a pressure of about 400 p.s.i. at a temperature of about 80° C. to 200° C.

11. A high density fluorine oxidizer composition containing principally tetrakis ($NF_2$) cyclohexane and pentakis ($NF_2$) cyclohexane.

12. The process which comprises reacting cyclohexadiene with $N_2F_4$ and recovering a product containing a mixture of compounds selected from the group consisting of difluoraminated cyclohexanes, difluoraminated cyclohexenes, and difluoraminated cyclohexadiene.

13. The process which comprises reacting a cyclohexadiene/$N_2F_4$ reaction mixture containing a major amount of tris ($NF_2$) cyclohexenes with $N_2F_4$ at a pressure in the range of about 200 to about 600 p.s.i. at a temperature in the range of about 125° to 250° C., and recovering a product containing pentakis difluoramino cyclohexane.

No references cited.

CHARLES B. PARKER, *Primary Examiner.*

LEON D. ROSDOL, *Examiner.*

J. W. WHISLER, P. C. IVES, *Assistant Examiners.*